US012567655B2

(12) United States Patent
Jeon et al.

(10) Patent No.: US 12,567,655 B2
(45) Date of Patent: Mar. 3, 2026

(54) BATTERY MODULE, BATTERY PACK INCLUDING SAME, AND AUTOMOBILE

(71) Applicant: LG ENERGY SOLUTION, LTD., Seoul (KR)

(72) Inventors: Byeong-Jun Jeon, Daejeon (KR); Ji-Myong An, Daejeon (KR); Young-Su Son, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 604 days.

(21) Appl. No.: 17/775,538

(22) PCT Filed: Apr. 7, 2021

(86) PCT No.: PCT/KR2021/004381
§ 371 (c)(1),
(2) Date: May 9, 2022

(87) PCT Pub. No.: WO2021/206457
PCT Pub. Date: Oct. 14, 2021

(65) Prior Publication Data
US 2022/0376365 A1 Nov. 24, 2022

(30) Foreign Application Priority Data
Apr. 9, 2020 (KR) ........................ 10-2020-0043498

(51) Int. Cl.
*H01M 50/517* (2021.01)
*H01M 50/152* (2021.01)
*H01M 50/213* (2021.01)

(52) U.S. Cl.
CPC ....... *H01M 50/517* (2021.01); *H01M 50/152* (2021.01); *H01M 50/213* (2021.01); *H01M 2220/20* (2013.01)

(58) Field of Classification Search
None
See application file for complete search history.

(56) References Cited

U.S. PATENT DOCUMENTS

2013/0255293 A1 10/2013 Gadawski et al.
2014/0162105 A1 6/2014 Klausmann et al.
(Continued)

FOREIGN PATENT DOCUMENTS

CN 105609681 A 5/2016
CN 207781681 U 8/2018
(Continued)

OTHER PUBLICATIONS

Machine translation JPWO2019230879A1 (Year: 2025).*
(Continued)

*Primary Examiner* — Brian R Ohara
*Assistant Examiner* — M. T. Leonard
(74) *Attorney, Agent, or Firm* — Morgan, Lewis & Bockius LLP

(57) ABSTRACT

A battery module includes a plurality of battery cells, a first cell frame and a second cell frame disposed at front and rear sides, respectively, and coupled to each other to define an internal space in which the plurality of battery cells is disposed, and having a hole of a predetermined size, a plurality of fixing bars, each disposed in each of a front surface of the first cell frame and a rear surface of the second cell frame and configured to limit front-rear movement of the first and second cell frames, and at least one long bolt inserted into the hole, and having a front end part coupled to the fixing bar disposed in the front surface of the first cell frame and a rear end part coupled to the fixing bar disposed in the rear surface of the second cell frame.

6 Claims, 15 Drawing Sheets

(56)                   References Cited

U.S. PATENT DOCUMENTS

| | | | |
|---|---|---|---|
| 2015/0270570 A1 | 9/2015 | Hatta et al. | |
| 2016/0301056 A1 * | 10/2016 | Yi | H01M 50/213 |
| 2016/0381781 A1 | 12/2016 | Park | |
| 2018/0151857 A1 | 5/2018 | Gang et al. | |
| 2018/0233720 A1 | 8/2018 | Gang et al. | |

FOREIGN PATENT DOCUMENTS

| | | |
|---|---|---|
| JP | 2006-140022 A | 6/2006 |
| JP | 2007-234369 A | 9/2007 |
| JP | 2008-110693 A | 5/2008 |
| JP | 2010-050044 A | 3/2010 |
| JP | 2010-205509 A | 9/2010 |
| JP | 2011-159474 A | 8/2011 |
| JP | 2013-105724 A | 5/2013 |
| JP | 2014-107270 A | 6/2014 |
| KR | 10-2014-0066104 A | 5/2014 |
| KR | 10-1441900 B1 | 9/2014 |
| KR | 10-2015-0038036 A | 4/2015 |
| KR | 10-2015-0084661 A | 7/2015 |
| KR | 10-2017-0001121 A | 1/2017 |
| KR | 10-2017-0099670 A | 9/2017 |
| KR | 10-2018-0060820 A | 6/2018 |
| KR | 10-2019-0045611 A | 5/2019 |
| KR | 10-2085750 B1 | 3/2020 |
| WO | 2019/230879 A | 12/2019 |
| WO | WOJP2019230879 A1 * | 12/2019 ......... H01M 50/213 |

OTHER PUBLICATIONS

Office Action issued in corresponding Japanese Patent Application No. 2022-526266, dated May 22, 2023.
Office Action issued Aug. 23, 2023 for counterpart Chinese Patent Application No. 202180006750.8. Note 1: CN207781681-U, US2018/0151857, and JP2008-110693 cited therein are already of record Note 2: CN103840103-A has corresponding US2014/0162105 and CN104641489-A has corresponding US 2015/0270570. Both US corresponding documents are already of record.
International Search Report (with partial translation) and Written Opinion dated Jul. 20, 2021, for corresponding International Patent Application No. PCT/KR2021/004381.

* cited by examiner

FIG. 15

**Before and after test,
Internal resistance (IR)**

|          | IR Value(mΩ) | |
|----------|--------|--------|
|          | Before | After  |
| Bank 1   | 6.37   | 6.72   |
| Bank 2   | 5.48   | 5.68   |
| Bank 3   | 5.39   | 5.66   |
| Bank 4   | 5.48   | 5.68   |
| Bank 5   | 5.41   | 5.72   |
| Bank 6   | 5.52   | 5.68   |
| Bank 7   | 5.5    | 5.71   |
| Bank 8   | 5.47   | 5.6    |
| Bank 9   | 5.46   | 5.62   |
| Bank 10  | 5.38   | 5.51   |
| Bank 11  | 5.53   | 5.69   |
| Bank 12  | 5.56   | 5.68   |
| Bank 13  | 5.56   | 5.72   |
| Bank 14  | 4.82   | 4.97   |

BATTERY MODULE, BATTERY PACK INCLUDING SAME, AND AUTOMOBILE

TECHNICAL FIELD

The present disclosure relates to a battery module, a battery pack comprising the same, and a vehicle, and more particularly, to a battery module with improved durability and a battery pack comprising the same.

The present application claims the benefit of Korean Patent Application No. 10-2020-0043498 filed on Apr. 9, 2020 with the Korean Intellectual Property Office, the disclosure of which is incorporated herein by reference in its entirety.

BACKGROUND ART

Recently, with the rapid increase in demand for portable electronic products such as laptop computers, video cameras, and mobile phones and the extensive development of electric vehicles, accumulators for energy storage, robots and satellites, many studies are being made on high performance secondary batteries that can be repeatedly recharged.

Currently, commercially available secondary batteries include nickel-cadmium batteries, nickel-hydrogen batteries, nickel-zinc batteries, lithium secondary batteries and the like, and among them, lithium secondary batteries have little or no memory effect, and thus they are gaining more attention than nickel-based secondary batteries for their advantages that recharging can be done whenever it is convenient, the self-discharge rate is very low and the energy density is high.

A lithium secondary battery primarily uses a lithium-based oxide and a carbon material as a positive electrode active material and a negative electrode active material respectively. Additionally, the lithium secondary battery includes an electrode assembly including a positive electrode plate and a negative electrode plate coated with the positive electrode active material and the negative electrode active material respectively with a separator interposed between the positive electrode plate and the negative electrode plate, and a packaging or a battery case in which the electrode assembly is hermetically received together with an electrolyte solution.

Additionally, lithium secondary batteries may be classified into can-type secondary batteries including the electrode assembly embedded in a metal can and pouch-type secondary batteries including the electrode assembly embedded in a pouch of an aluminum laminate sheet according to the shape of the packaging.

Among them, the can-type secondary batteries may be fabricated with the metal can of a cylindrical shape in which the electrode assembly is embedded. The can-type secondary batteries may be used to form a battery module including a module case in which a plurality of secondary batteries is received and a busbar configured to electrically connect the plurality of secondary batteries.

The module case includes a plurality of cell frames having a receiving space in which a plurality of secondary batteries is received. The plurality of cell frames is configured to cover one side or the other side of the plurality of can-type secondary batteries. The plurality of cell frames is coupled to one another surrounding one side or the other side of the plurality of secondary batteries. However, due to the weak coupling between the plurality of cell frames, when the coupled state of the plurality of cell frames is not stably maintained, spacing may be created between the plurality of cell frames during the use of the battery module, and as a consequence, a gap may be formed between the can-type secondary batteries received in the module case and the receiving space. In this instance, when external impacts or frequent vibrations occur in the battery module, the received can-type secondary batteries are not fixed in the module case, and may vibrate or move in the receiving space. When the can-type secondary batteries continuously vibrate or move in the receiving space, the joined part between the can-type secondary batteries and the busbar may be vulnerable to damage, causing a short circuit.

Further, the plurality of cell frames is coupled using a plurality of screw bolts to increase the coupling of the plurality of cell frames, but too many screw bolts are used and it takes a long time to perform an assembly process. On the contrary, in case that a smaller number of screw bolts are used for coupling of the plurality of cell frames, the coupling of the plurality of cell frames is lower than a predetermined reference, creating a gap between the received can-type secondary batteries and the receiving space as described previously, resulting in a high likelihood that an electrical short circuit occurs between the plurality of secondary battery cells and the busbar in the event of external impacts and frequent vibrations.

DISCLOSURE

Technical Problem

The present disclosure is designed to solve the above-described problem, and therefore the present disclosure is directed to providing a battery module with improved durability against external impacts or vibrations, and a battery pack comprising the same.

These and other objects and advantages of the present disclosure may be understood by the following description, and will be apparent from the embodiments of the present disclosure. In addition, it will be readily appreciated that the objects and advantages of the present disclosure may be realized by means and combinations thereof.

Technical Solution

To achieve the above-described object, a battery module according to the present disclosure includes a plurality of battery cells, a first cell frame and a second cell frame disposed at front and rear sides, respectively, and coupled to each other to form an internal space in which the plurality of battery cells is received, and having a hole of a predetermined size, a plurality of fixing bars, each disposed in each of a front surface of the first cell frame and a rear surface of the second cell frame and configured to limit front-rear movement of the first and second cell frames, and at least one long bolt inserted into the hole, and having a front end part coupled to the fixing bar disposed in the front surface of the first cell frame and a rear end part coupled to the fixing bar disposed in the rear surface of the second cell frame.

Additionally, the plurality of fixing bars includes a first fixing bar disposed in the front surface of the first cell frame and vertically extending, and a second fixing bar disposed in the rear surface of the second cell frame and vertically extending.

Moreover, the battery module may further include a first cover configured to cover top of the first cell frame and the second cell frame, a part of the first cover being coupled to top of each of the first fixing bar and the second fixing bar, and a second cover configured to cover bottom of the first cell frame and the second cell frame, and coupled to the bottom of each of the first fixing bar and the second fixing bar.

Furthermore, the first cover may include a first body portion horizontally extending to cover upper surfaces of the first cell frame and the second cell frame, and a first coupling portion stepped down from the first body portion, extending in a front-rear direction from the first body portion and coupled to the top of each of the first fixing bar and the second fixing bar.

Additionally, the second cover may include a second body portion horizontally extending to cover lower surfaces of the first cell frame and the second cell frame, and a second coupling portion stepped up from the second body portion, extending in the front-rear direction from the second body portion and coupled to the bottom of each of the first fixing bar and the second fixing bar.

Further, at least two first fixing bars may be provided, at least two second fixing bars may be provided, the at least two first fixing bars may be spaced apart from each other in a horizontal direction on the front surface of the first cell frame, the at least two second fixing bars may be spaced apart from each other in the horizontal direction on the rear surface of the second cell frame, and the battery module may further include at least one reinforcement bolt horizontally extending and having two end parts coupled to the at least two first fixing bars or the at least two second fixing bars.

Additionally, the first cover may include a first bent portion extending down from left and right ends of the first body portion along outer surfaces of the first cell frame and the second cell frame, and the second cover may include a second bent portion extending up from left and right ends of the second body portion along the outer surfaces of the first cell frame and the second cell frame.

Furthermore, an end part of the first bent portion of the first cover and an end part of the second bent portion of the second cover may be coupled to each other.

Additionally, to achieve the above-described object, a battery pack according to the present disclosure includes at least one battery module and a pack housing including a top case, a bottom case and a middle case having a top coupled to the top case and a bottom coupled to the bottom case.

Further, the middle case may include a coupling rib on an inner surface, the coupling rib protruding inward and vertically extending, and the coupling rib may be coupled to each of the first cover and the second cover.

Additionally, to achieve the above-described object, a vehicle according to the present disclosure includes at least one battery pack.

Advantageous Effects

According to an aspect of the present disclosure, the present disclosure includes the plurality of fixing bars, each disposed in each of the front surface of the first cell frame and the rear surface of the second cell frame and configured to limit the front-rear movement of the first cell frame and the second cell frame; and at least one long bolt inserted into the hole and having the front end part coupled to the fixing bar disposed in the front surface of the first cell frame and the rear end part coupled to the fixing bar disposed in the rear surface of the second cell frame, so it is possible to limit the front-rear movement of the first cell frame and the second cell frame by the plurality of fixing bars, thereby stably keeping the first cell frame and the second cell frame in coupled state.

Additionally, according to an aspect of an embodiment of the present disclosure, the present disclosure further includes the first cover configured to cover the top of the first cell frame and the second cell frame, a part of the first cover being coupled to the top of each of the first fixing bar and the second fixing bar; and the second cover configured to cover the bottom of the first cell frame and the second cell frame and coupled to the bottom of each of the first fixing bar and the second fixing bar, to protect the top and the bottom of the battery module when external impacts occur, and as the first cover and the second cover are coupled to the top and the bottom of each of the first fixing bar and the second fixing bar, it is possible to fix the first fixing bar and the second fixing bar more firmly.

Further, according to an aspect of an embodiment of the present disclosure, the middle case of the present disclosure includes the coupling rib on the inner surface, the coupling rib protruding inward and vertically extending, and the coupling rib is coupled to each of the first cover and the second cover using a bolt, thereby limiting the vertical movement of the battery module received in the pack housing by the wide support area of the first cover and the second cover without a stopper. Additionally, the present disclosure couples the battery module received in the pack housing to the middle case rather than the top case or the bottom case.

BRIEF DESCRIPTION OF THE DRAWINGS

The accompanying drawings illustrate the preferred embodiments of the present disclosure, and together with the following detailed description, serve to provide a further understanding of the technical aspect of the present disclosure. However, the present disclosure should not be construed as being limited to the drawings.

FIG. 15 is a table showing the measured values of internal resistance (IR) of a battery of example before and after a vibration test.

DETAILED DESCRIPTION

Figure 1:
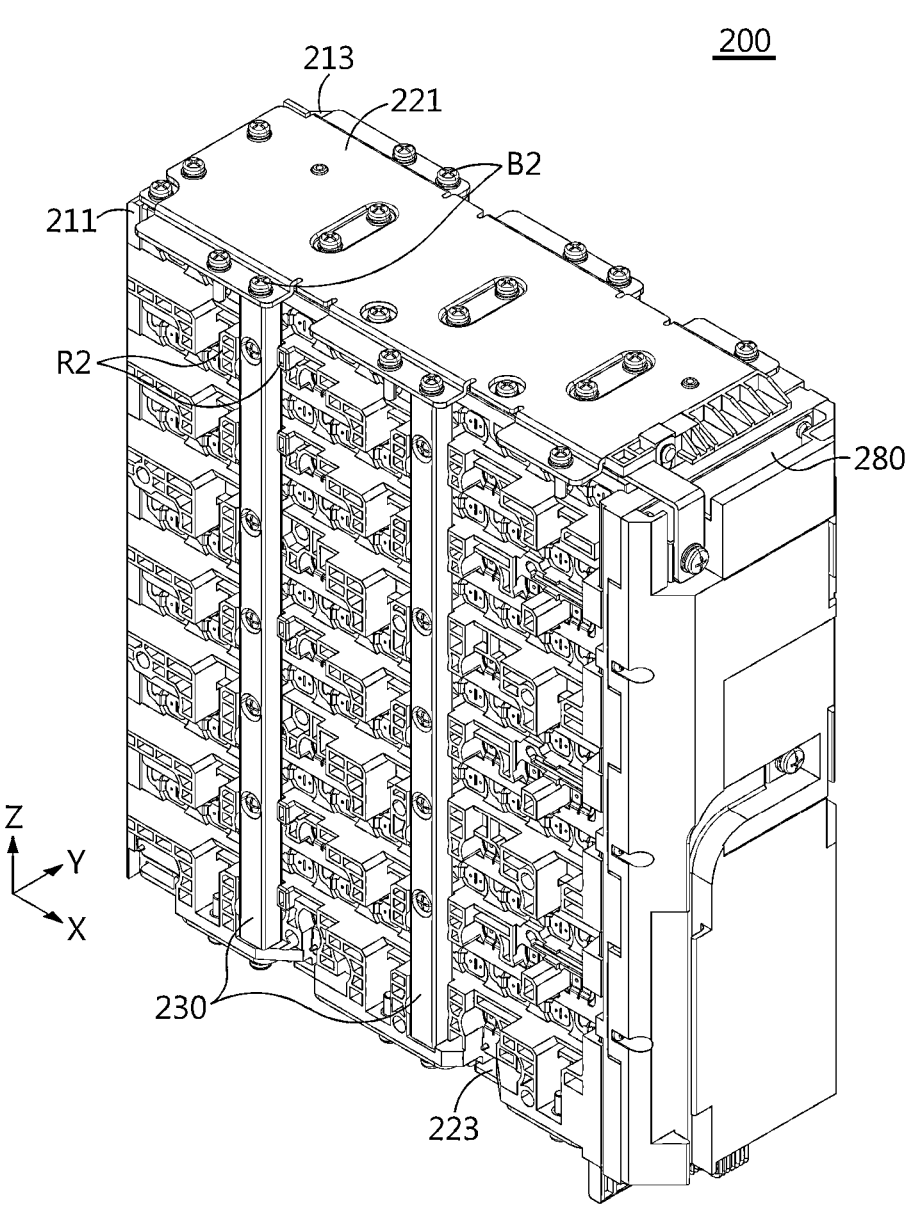
FIG. 1 is a perspective view schematically showing a battery module according to an embodiment of the present disclosure.

Hereinafter, the preferred embodiments of the present disclosure will be described in detail with reference to the accompanying drawings. Prior to the description, it should be understood that the terms or words used in the specification and the appended claims should not be construed as being limited to general and dictionary meanings, but rather interpreted based on the meanings and concepts corresponding to the technical aspects of the present disclosure on the basis of the principle that the inventor is allowed to define the terms appropriately for the best explanation.

Therefore, the embodiments described herein and the illustrations shown in the drawings are just a most preferred embodiment of the present disclosure, but not intended to fully describe the technical aspects of the present disclosure, so it should be understood that a variety of other equivalents and modifications could have been made thereto at the time that the application was filed.

Figure 2:
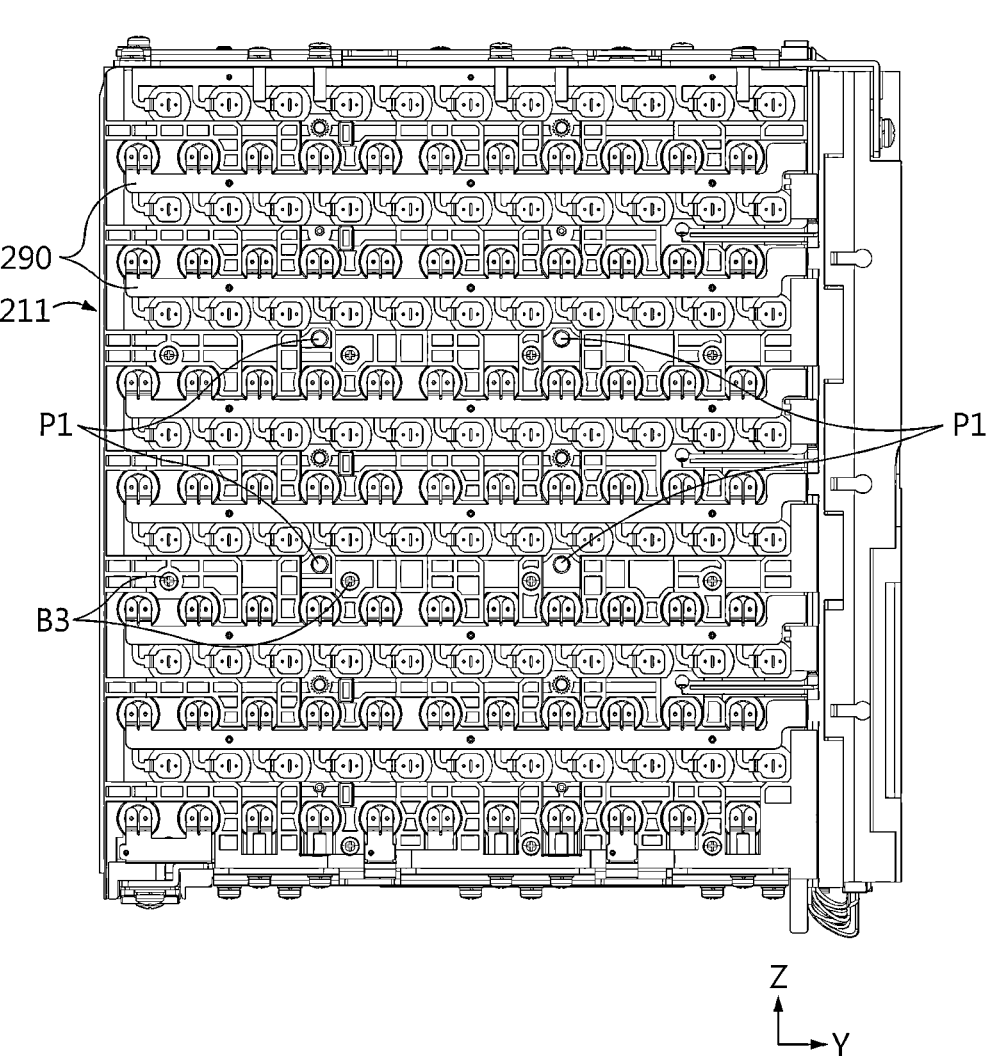
FIG. 2 is a front view schematically showing some elements of a battery module according to an embodiment of the present disclosure.
Figure 3:
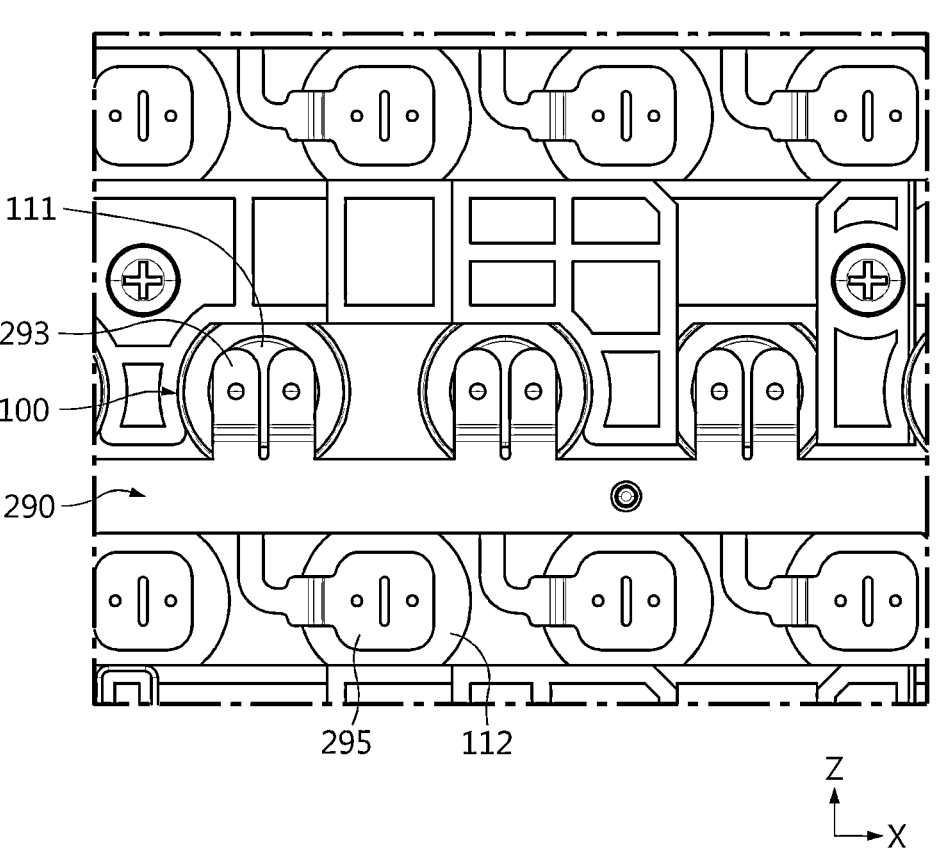
FIG. 3 is a partial enlarged diagram schematically showing some elements of the battery module of FIG. 2.
Figure 4:
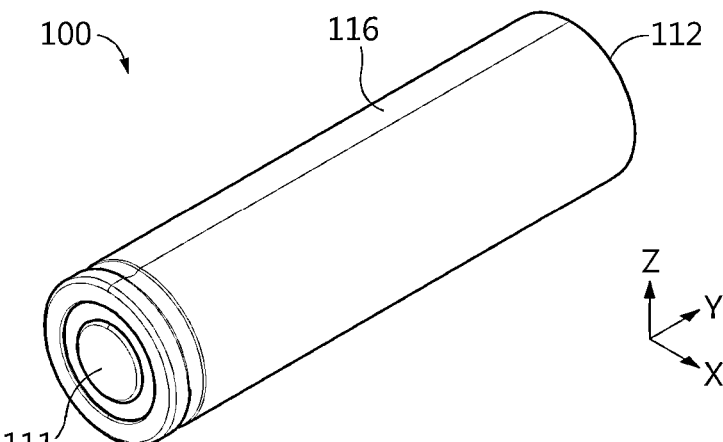
FIG. 4 is a perspective view schematically showing a battery cell of a battery module according to an embodiment of the present disclosure.
Figure 5:
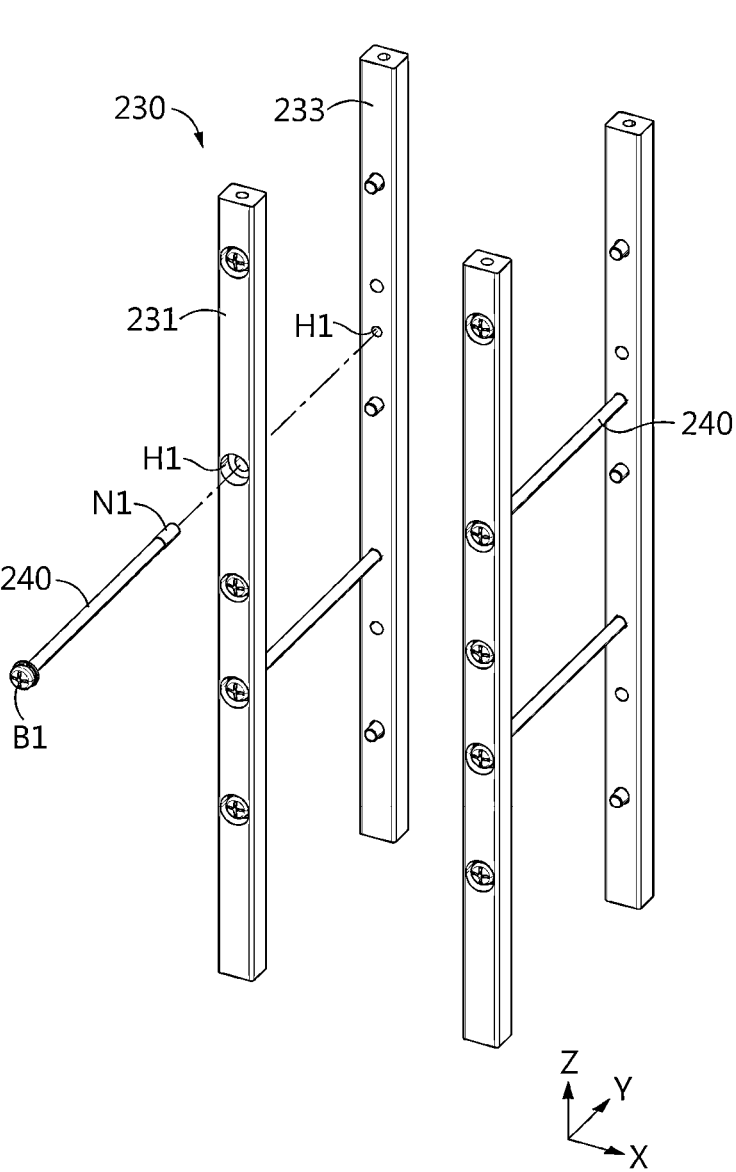
FIG. 5 is an exploded perspective view schematically showing fixing bars and long bolts of a battery module according to another embodiment of the present disclosure.

FIG. 1 is a perspective view schematically showing a battery module according to an embodiment of the present disclosure. FIG. 2 is a front view schematically showing some elements of the battery module according to an embodiment of the present disclosure. FIG. 3 is a partial enlarged diagram schematically showing some elements of the battery module of FIG. 2. FIG. 4 is a perspective view schematically showing a battery cell of the battery module according to an embodiment of the present disclosure. Additionally, FIG. 5 is an exploded perspective view schematically showing fixing bars and long bolts of the battery module according to an embodiment of the present disclosure. For reference, in FIG. 1, the positive X-axis direction is a left direction, the negative X-axis direction is a right direction, the positive Y-axis direction is a rear direction, the negative Y-axis direction is a forward direction, the positive Z-axis direction is an upward direction, and the negative Z-axis direction is a downward direction.

Referring to FIGS. 1 to 5, the battery module 200 according to an embodiment of the present disclosure includes a plurality of battery cells 100, a module busbar 290, a first cell frame 211, a second cell frame 213, a plurality of module busbars 290, a plurality of fixing bars 230 and at least one long bolt 240.

Here, as shown in FIG. 4, the battery cell 100 may include a cylindrical battery can 116, and an electrode assembly (not shown) received in the battery can 116.

Additionally, the battery can 116 may include a material having high electrical conductivity, and for example, the battery can 116 may include aluminum or copper.

Further, as shown in FIG. 4, the battery can 116 may be placed in the front-rear direction. Additionally, the battery can 116 may have a cylindrical shape that vertically extends. Electrode terminals 111, 112 may be formed at the front and rear end parts of the battery can 116. Specifically, the electrode terminals may include a positive electrode terminal 111 and a negative electrode terminal 112. The positive electrode terminal 111 may be formed on the flat surface of the front end part of the battery can 116, and the negative electrode terminal 112 may be formed on the flat circular rear surface of the rear end part of the battery can 116. However, the configuration of the battery cell 100 is not necessarily limited thereto, and on the contrary, the battery cell 100 may include the negative electrode terminal 112 disposed at the front end part and the positive electrode terminal 111 disposed at the rear end part.

Further, a plurality of battery cells 100 may be arranged in the horizontal and vertical directions. The configuration of the battery cell 100 is well known to those skilled in the art at the time of filing the patent application present disclosure, and its detailed description is omitted.

Meanwhile, the module busbar 290 may be configured to electrically connect the plurality of battery cells 100. The plurality of module busbars 290 may be mounted on each of the front surface of the first cell frame 211 and the rear surface of the second cell frame 213.

Additionally, as shown in FIG. 3, the module busbar 290 may include a first connection portion 293 and a second connection portion 295. For example, the second connection portion 295 may contact the negative electrode terminal 112, and the first connection portion 293 may contact the positive electrode terminal 111. That is, the electrode terminal which the second connection portion 295 contacts may be the negative electrode terminal 112 of the opposite electrical polarity to the electrode terminal which the first connection portion 293 contacts.

Figure 6:
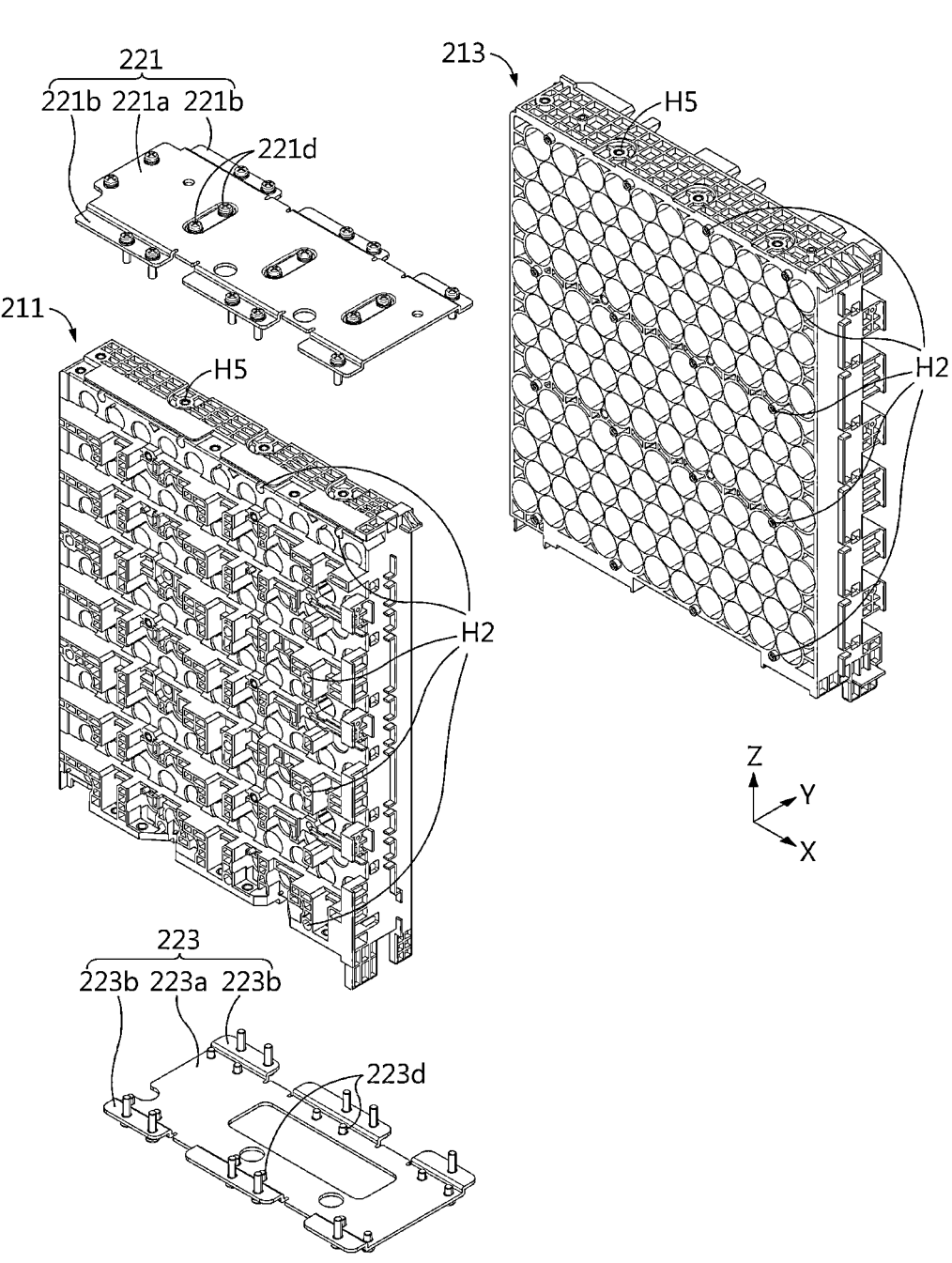
FIG. 6 is an exploded perspective view schematically showing some elements of a battery module according to an embodiment of the present disclosure.

FIG. 6 is an exploded perspective view schematically showing some elements of the battery module according to an embodiment of the present disclosure.

Referring to FIG. 6 together with FIG. 2, the first cell frame 211 and the second cell frame 213 may be disposed on the front and rear sides respectively. The first cell frame 211 and the second cell frame 213 may be coupled to each other. The first cell frame 211 and the second cell frame 213 may be coupled such that the rear end of the first cell frame 211 and the front end of the second cell frame 213 overlap. To this end, each of the first cell frame 211 and the second cell frame 213 may have frame holes H2. The frame holes H2 formed in each of the first cell frame 211 and the second cell frame 213 may be formed at the opposing locations in the front-rear direction. In this instance, as shown in FIGS. 2 and 6, the first cell frame 211 and the second cell frame 213 may be coupled and fixed to each other with screw bolts B3 that are inserted into the frame holes H2 formed in each of the first cell frame 211 and the second cell frame 213. That is, the screw bolts B3 may be screw-coupled to female screws formed in the frame holes H2 formed in the second cell frame 213.

Additionally, the first cell frame 211 and the second cell frame 213 may have a receiving space in which at least a part of the battery cell 100 is received. For example, each of the first cell frame 211 and the second cell frame 213 may have a plurality of hollows into which each of the plurality of battery cells 100 is inserted. That is, when the first cell frame 211 and the second cell frame 213 are coupled to each other, the hollows formed in each of the first cell frame 211 and the second cell frame 213 may be coupled to each other to form the receiving space in which the plurality of battery cells 100 is received.

Further, the first cell frame 211 and the second cell frame 213 may include an electrically insulating material. For example, the electrically insulating material may be polymer plastics. More specifically, the electrically insulating material may be poly vinyl chloride.

Additionally, as shown in FIG. 2, each of the first cell frame 211 and the second cell frame 213 may have a hole P1 of a predetermined size. A part of each of the first cell frame 211 and the second cell frame 213 passes through the hole P1 in the front-rear direction. That is, the hole P1 of the first cell frame 211 and the hole (not shown) of the second cell frame 213 may be formed at the opposing locations in the front-rear direction. The long bolt 240 may be inserted into the hole P1. The hole P1 may have an internal structure of a corresponding size to a part of the long bolt 240.

Further, each of the plurality of fixing bars 230 may be disposed in the front surface of the first cell frame 211 and the rear surface of the second cell frame 213. For example, as shown in FIGS. 1 and 5, two fixing bars 230 may be provided in the front surface of the first cell frame 211, and two fixing bars 230 may be provided in the rear surface of the second cell frame 213. Additionally, the plurality of fixing bars 230 may be disposed in close contact with the front surface of the first cell frame 211. The plurality of fixing bars 230 may be disposed in close contact with the rear surface of the second cell frame 213.

Additionally, the plurality of fixing bars 230 may be configured to limit the front-rear movement of the first cell frame 211 and the second cell frame 213. That is, the fixing bar 230 fixed to the front surface of the first cell frame 211 and the fixing bar 230 fixed to the rear surface of the second cell frame 213 may constrain each other's movement, thereby limiting the front-rear movement of the first cell frame 211 and the second cell frame 213.

Specifically, the plurality of fixing bars 230 may constrain each other using the long bolt 240. For example, the long bolt 240 may have a cylindrical shape extending in the front-rear direction. A male screw N1 may be formed in the outer surface of the front end part of the long bolt 240 or the rear end part. The long bolt 240 may have a bolt head B1 in the front end part or the rear end part.

The plurality of fixing bars 230 may have an insertion hole H1 running in the front-rear direction. The insertion hole H1 may have a female screw on the inner surface. That is, the end of the long bolt 24 may be inserted into and screw-coupled to the insertion hole H1.

Additionally, as shown in FIGS. 2 and 5, the at least one long bolt 240 may have the body inserted into the hole P1 of each of the first cell frame 211 and the second cell frame 213. The long bolt 240 may have the front end part coupled to the fixing bar 230 disposed in the front surface of the first cell frame 211 and the rear end part coupled to the fixing bar 230 disposed in the rear surface of the second cell frame 213.

According to this configuration of the present disclosure, the present disclosure includes the plurality of fixing bars 230, each disposed in each of the front surface of the first cell frame 211 and the rear surface of the second cell frame 213 and configured to limit the front-rear movement of the first cell frame 211 and the second cell frame 213, and the at least one long bolt 240 inserted into the hole P1, and having the front end part coupled to the fixing bar 230 disposed in the front surface of the first cell frame 211 and the rear end part coupled to the fixing bar 230 disposed in the rear surface of the second cell frame 213, so it is possible to limit the front-rear movement of the first cell frame 211 and the second cell frame 213 by the plurality of fixing bars 230, thereby stably keeping the first cell frame 211 and the second cell frame 213 in coupled state.

Figure 7:
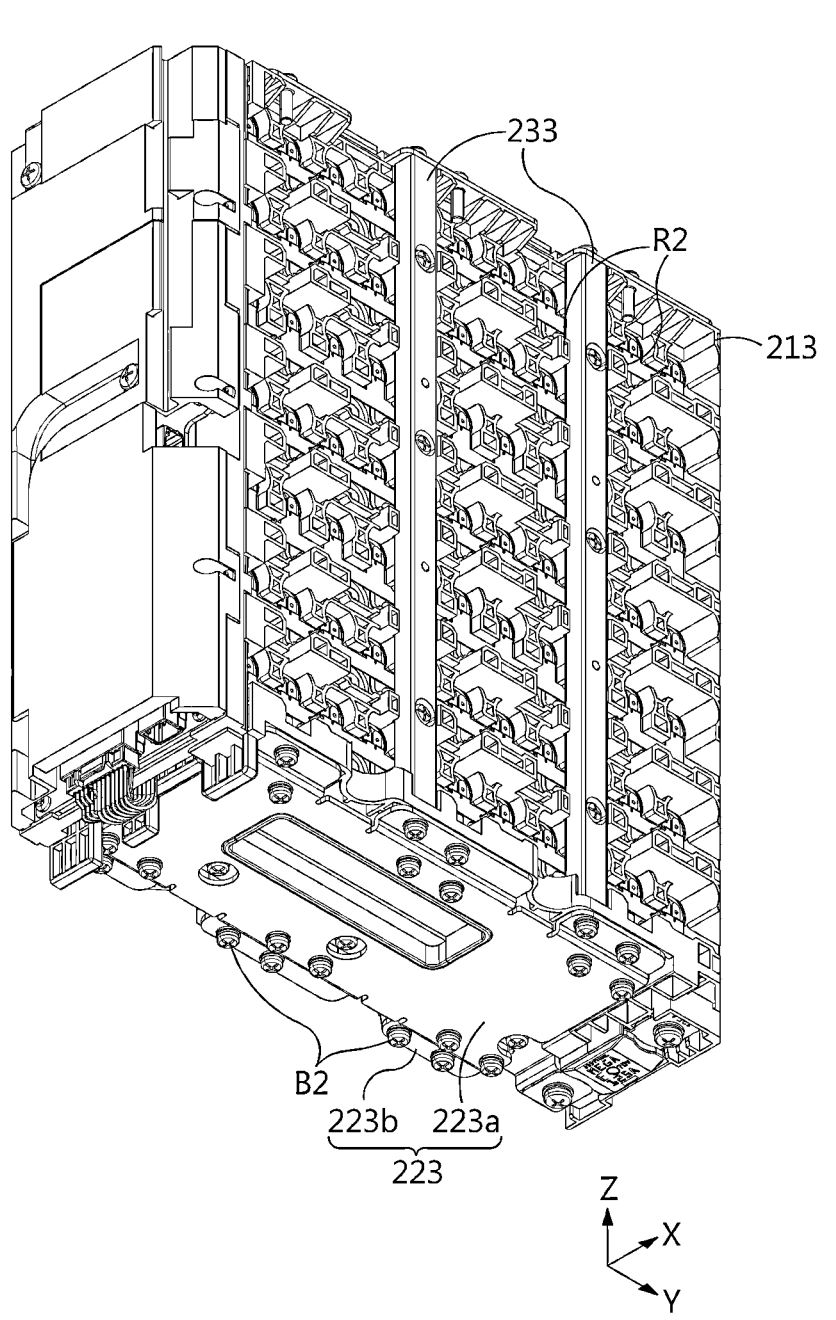
FIG. 7 is a rear bottom perspective view schematically showing a battery module according to an embodiment of the present disclosure.

FIG. 7 is a rear bottom perspective view schematically showing the battery module according to an embodiment of the present disclosure.

Referring to FIG. 7 together with FIGS. 1 and 5, the plurality of fixing bars 230 may include a first fixing bar 231 and a second fixing bar 233. The first fixing bar 231 may be disposed in close contact with the front surface of the first cell frame 211. Fixing ribs R2, R2 may be formed on the front surface of the first cell frame 211, and the first fixing bar 231 may be interposed between the fixing ribs R2, R2. A space between the fixing ribs R2, R2 may have a corresponding size to the shape of the first fixing bar 231. The first fixing bar 231 may have a shape of a hexahedral bar that vertically extends. The first fixing bar 231 may be in close contact with the outer surface of the first cell frame 211 and the outer surface of the fixing ribs R2, R2.

Additionally, the second fixing bar 233 may be disposed in close contact with the rear surface of the second cell frame 213. The fixing ribs R2, R2 may be formed on the rear surface of the second cell frame 213, and the second fixing bar 233 may be interposed between the fixing ribs R2, R2. A space between the fixing ribs R2, R2 may have a corresponding size to the shape of the second fixing bar 233. The second fixing bar 233 may have a shape of a hexahedral bar that vertically extends. The second fixing bar 233 may be in close contact with the outer surface of the second cell frame 213 and the outer surface of the fixing ribs R2, R2.

Additionally, at least two first fixing bars 231 may be provided. At least two second fixing bars 233 may be provided. For example, as shown in FIG. 5, the at least two first fixing bars 231 may be spaced apart from each other in the horizontal direction on the front surface of the first cell frame 211. The at least two second fixing bars 233 may be spaced apart from each other in the horizontal direction on the rear surface of the second cell frame 213.

According to this configuration of the present disclosure, each of the first fixing bar 231 and the second fixing bar 233 is received and supported between the fixing ribs R2, R2 formed in each of the first cell frame 211 and the second cell frame 213, thereby increasing the front-rear coupling of the first cell frame 211 and the second cell frame 213 and preventing the horizontal movement of the first fixing bar 231 and the second fixing bar 233 by the fixing ribs R2, R2.

Meanwhile, referring to FIGS. 6 and 7 together with FIG. 1, the battery module 200 according to an embodiment of the present disclosure may further include a first cover 221 and a second cover 223. Specifically, the first cover 221 may be configured to cover the top of the first cell frame 211 and the second cell frame 213. That is, the first cover 221 may have a shape of a plate that horizontally extends. The first cover 221 may include a first coupling portion 221*d* coupled to the top of each of the first cell frame 211 and the second cell frame 213. The first coupling portion 221*d* may be coupled to a coupling hole H5 formed in the top of each of the first cell frame 211 and the second cell frame 213 using a screw bolt. The second cover 223 may include a second coupling portion 223*d* coupled to the bottom of each of the first cell frame 211 and the second cell frame 213. The second coupling portion 223*d* may be coupled to a coupling hole (not shown) formed in the bottom of each of the first cell frame 211 and the second cell frame 213 using a screw bolt.

Additionally, as shown in FIG. 1, a part of the first cover 221 may be coupled to the top of each of the first fixing bar 231 and the second fixing bar 233. In this instance, the first cover 221 may be bolt-coupled to the upper end part of each of the first fixing bar 231 and the second fixing bar 233 using a screw bolt B2.

Further, referring to FIG. 7, the second cover 223 may be configured to cover the bottom of the first cell frame 211 and the second cell frame 213. That is, the second cover 223 may have a shape of a plate that horizontally extends. A part of the second cover 223 may be coupled to the bottom of each of the first fixing bar 231 and the second fixing bar 233. In this instance, the second cover 223 may be bolt-coupled to each of the first fixing bar 231 and the second fixing bar 233 using a screw bolt.

According to this configuration of the present disclosure, the present disclosure includes the first cover 221 configured to cover the top of the first cell frame 211 and the second cell frame 213 wherein a part of the first cover 221 is coupled to the top of each of the first fixing bar 231 and the second fixing bar 233, and the second cover 223 configured to cover the bottom of the first cell frame 211 and the second cell frame 213 and coupled to the bottom of each of the first fixing bar 231 and the second fixing bar 233, to protect the top and the bottom of the battery module 200 when external impacts occur, and as the first cover 221 and the second cover 223 are coupled to the top and the bottom of each of the first fixing bar 231 and the second fixing bar 233, it is possible to fix the first fixing bar 231 and the second fixing bar 233 more firmly.

Accordingly, the first fixing bar 231 and the second fixing bar 233 increase the coupling of the first cell frame 211 and the second cell frame 213, thereby preventing damage to the contact or disconnection between the module busbar 290 and the battery cell 100 due to vibrations of the battery module 200 or external impacts.

More specifically, as shown in FIG. 6, the first cover 221 may include a first body portion 221a and a first coupling portion 221b. The first body portion 221a may horizontally extend to cover the upper surface of the first cell frame 211 and the second cell frame 213. The first coupling portion 221b may be stepped down from the first body portion 221a. The first coupling portion 221b may extend forward or rearward from the first body portion 221a. That is, the first coupling portion 221b stepped (bent) down from the front end of the first body portion 221a and extending forward may be provided at the front end part of the first cover 221. Additionally, the first coupling portion 221b stepped (bent) down from the rear end of the first body portion 221a and extending rearward may be provided at the rear end part of the first cover 221.

Additionally, the first coupling portion 221b may be coupled to the top of each of the first fixing bar 231 and the second fixing bar 233. For example, as shown in FIG. 1, the first coupling portion 221b extending frontward of the first cover 221 may be coupled to the top of the first fixing bar 231.

Further, the second cover 223 may include a second body portion 223a and a second coupling portion 223b. The second body portion 223a may horizontally extend to cover the lower surface of the first cell frame 211 and the second cell frame 213. The second coupling portion 223b may be stepped up from the second body portion 223a. The second coupling portion 223b may extend in the front-rear direction from the second body portion 223a. That is, a second coupling portion 223b stepped (bent) up from the front end of the second body portion 223a and extending forward may be provided at the front end part of the second cover 223. Additionally, the second coupling portion 223b stepped (bent) up from the rear end of the second body portion 223a and extending rearward may be provided at the rear end part of the second cover 223.

Additionally, the second coupling portion 223b may be coupled to the bottom of each of the first fixing bar 231 and the second fixing bar 233. For example, as shown in FIG. 1, the second coupling portion 223b extending frontward of the second cover 223 may be coupled to the bottom of the first fixing bar 231. For example, as shown in FIG. 7, the second coupling portion 223b extending rearward of the second cover 223 may be coupled to the bottom of the second fixing bar 233. In this instance, the second coupling portion 223b may be bolt-coupled through the screw bolt B2.

In this instance, the first cover 221 and the second cover 223 may be manufactured by compression molding to achieve the higher mechanical strength than injection molding.

According to this configuration of the present disclosure, the first cover 221 includes the first body part 221a and the first coupling portion 221b stepped downward and extending forward or rearward, and the second cover 223 includes the second body part 223a and the second coupling portion 223b stepped downward and extending forward or rearward, thereby strongly fixing the first fixing bar 231 and the second fixing bar 233 to prevent their vertical movement. That is, the stepped structure of the first coupling portion 221b and the second coupling portion 223b may exert a strong force in a mechanically dynamic manner to prevent the vertical movement of the first fixing bar 231 and the second fixing bar 233.

Figure 8:
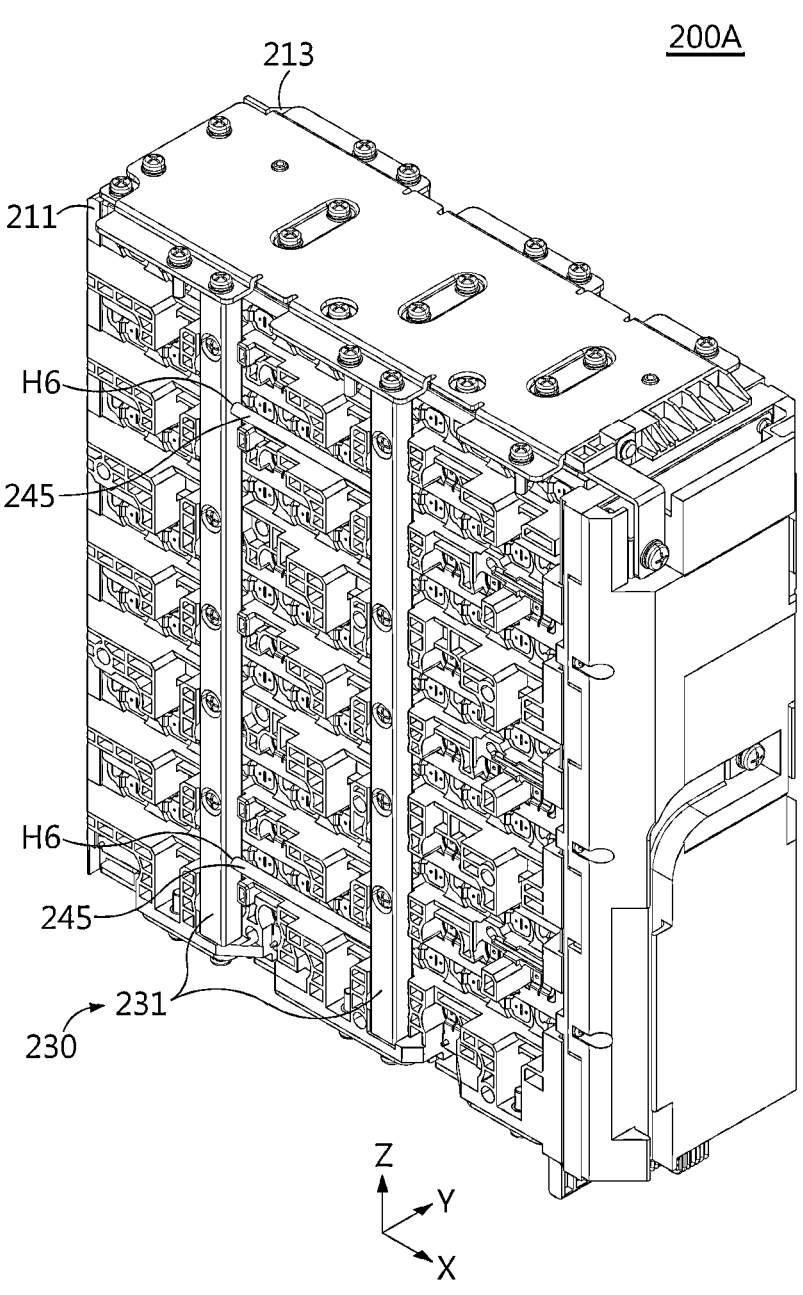
FIG. 8 is a perspective view schematically showing a battery module according to another embodiment of the present disclosure.

FIG. 8 is a perspective view schematically showing a battery module according to another embodiment of the present disclosure.

Referring to FIG. 8 together with FIG. 7, when compared with the battery module 200 of FIG. 1, the battery module 200A of FIG. 8 may further include at least one reinforcement bolt 245 coupled to at least one fixing bar.

Additionally, the reinforcement bolt 245 may horizontally extend and have the two end parts coupled to the at least two first fixing bars 231. Alternatively, the reinforcement bolt 245 (not shown) may have left and right ends coupled to at least two second fixing bars 233. For example, the reinforcement bolt 245 may have a male screw (not shown) at the two ends. Additionally, a connection groove H6 which is coupled to the reinforcement bolt 245 may be formed on the left and right sides of each of the first fixing bar 231 and the second fixing bar 233. A female screw (not shown) which is coupled to the male screw of the reinforcement bolt 245 may be provided in the inner surface of the connection groove H6.

According to this configuration of the present disclosure, the present disclosure further includes the at least one reinforcement bolt 245 horizontally extending and having the two end parts coupled to the at least two first fixing bars 231 or the at least two second fixing bars 233, thereby limiting the horizontal movement of the at least two first fixing bars 231 and the second fixing bar 233. Accordingly, it is possible to increase the coupling of the first cell frame 211 and the second cell frame 213 by the first fixing bar 231 and the second fixing bar 233.

Figure 9:
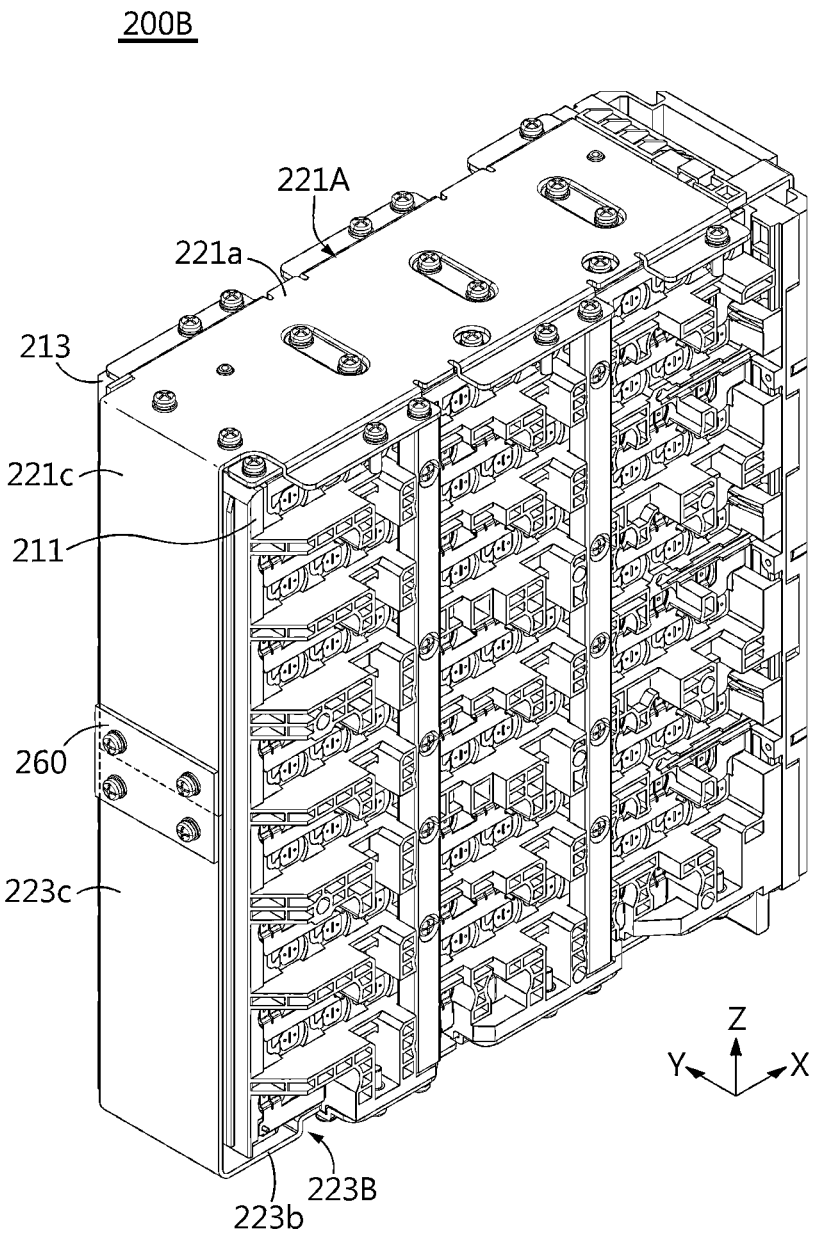
FIG. 9 is a left perspective view schematically showing a battery module according to still another embodiment of the present disclosure.

FIG. 9 is a left perspective view schematically showing a battery module according to still another embodiment of the present disclosure.

Referring to FIG. 9, when compared with the battery module 200 of FIG. 1, the battery module 200B of FIG. 9 may further include a first bent portion 221c provided in the first cover 221B and a second bent portion 223c provided in the second cover 223B. Specifically, the first bent portion 221c may extend down from the left and right ends of the first body portion 221a along the outer surface of the first cell frame 211 and the second cell frame 213. Additionally, the second bent portion 223c may extend up from the left and right ends of the second body portion 223a along the outer surface of the first cell frame 211 and the second cell frame 213.

For example, as shown in FIG. 9, the first bent portion 221c may extend down from the left end part of the first body portion 221a along the left surface of the first cell frame 211 and the second cell frame 213. The second bent portion 223c may extend up from the left end part of the second body portion 223a along the left surface of the first cell frame 211 and the second cell frame 213.

According to this configuration of the present disclosure, the first cover 221B includes the first bent portion 221c extending down from the left and right ends of the first body portion 221a along the outer surface of the first cell frame 211 and the second cell frame 213, the second cover 223B includes a second bent portion 223c extending up from the left and right ends of the second body portion 223a along the outer surface of the first cell frame 211 and the second cell frame 213, thereby protecting the left or right side wall of the first cell frame 211 and the second cell frame 213 from external impacts. Accordingly, it is possible to increase the safety of the battery module 200B.

Additionally, the end part of the first bent portion 221c of the first cover 221B and the end part of the second bent portion 223c of the second cover 223B may be coupled to each other. For example, the battery module 200B may include a coupling member 260 coupled to each of the end part of the first bent portion 221c of the first cover 221B and the end part of the second bent portion 223c of the second cover 223B. The coupling member 260 may have a shape of a plate that vertically stands upright. The coupling member 260 may be bolt-coupled to each of the end part of the first bent portion 221c of the first cover 221B and the end part of the second bent portion 223c of the second cover 223B.

According to this configuration of the present disclosure, the present disclosure is configured such that the end part of the first bent portion 221c of the first cover 221B and the end part of the second bent portion 223c of the second cover 223B are coupled to each other, so the coupling structure between the first bent portion 221c of the first cell frame 211 and the second bent portion 223c of the second cell frame 213 may limit the vertical movement of the first cell frame 211 and the second cell frame 213. Accordingly, it is possible to increase the vertical coupling of the first cell frame 211 and the second cell frame 213.

Figure 10:
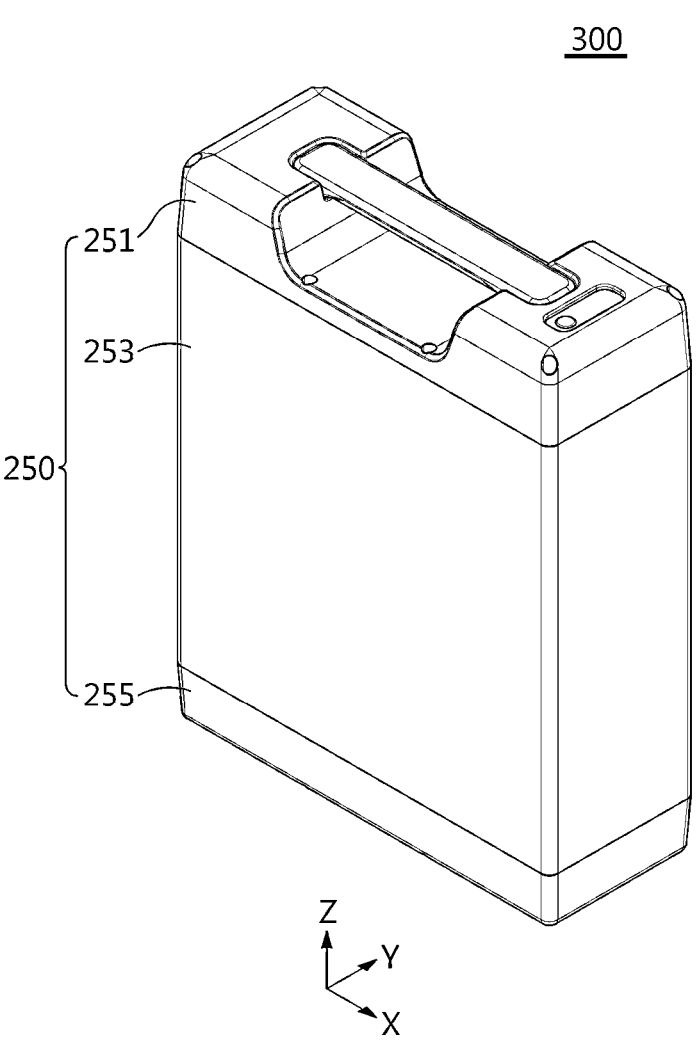
FIG. 10 is a perspective view schematically showing a battery pack according to an embodiment of the present disclosure.
Figure 11:
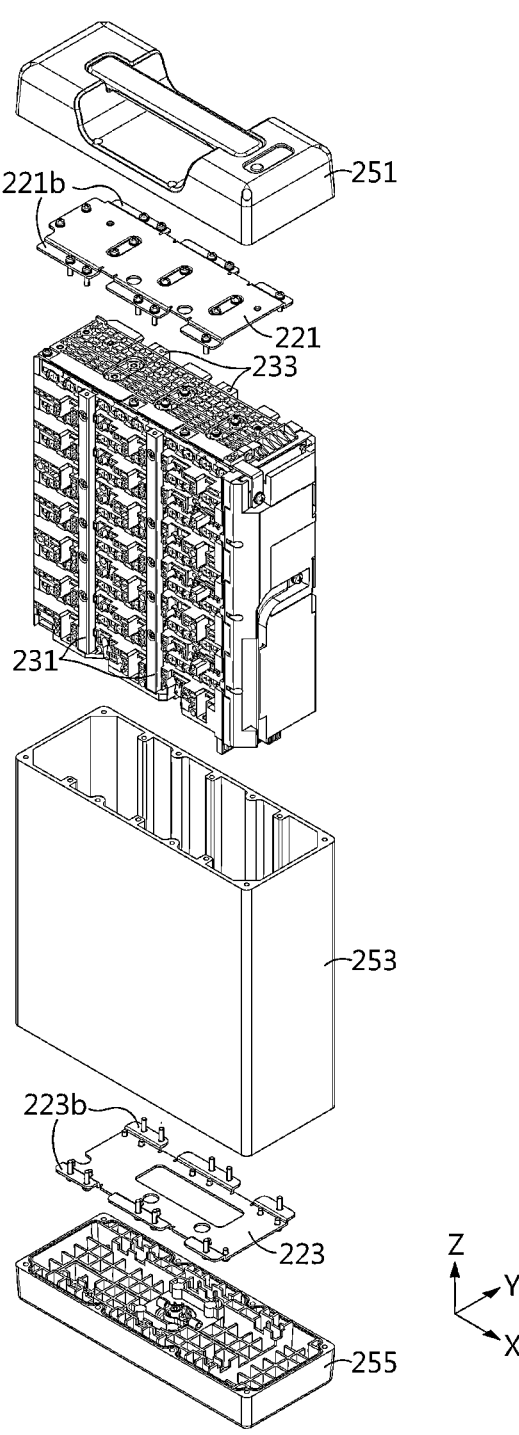
FIG. 11 is an exploded perspective view schematically showing some elements of a battery pack according to an embodiment of the present disclosure.

FIG. 10 is a perspective view schematically showing a battery pack according to an embodiment of the present disclosure. FIG. 11 is an exploded perspective view schematically showing some elements of the battery pack according to an embodiment of the present disclosure. Additionally, FIG. 12 is a top view schematically showing a middle case of the battery pack according to an embodiment of the present disclosure.

Figure 12:
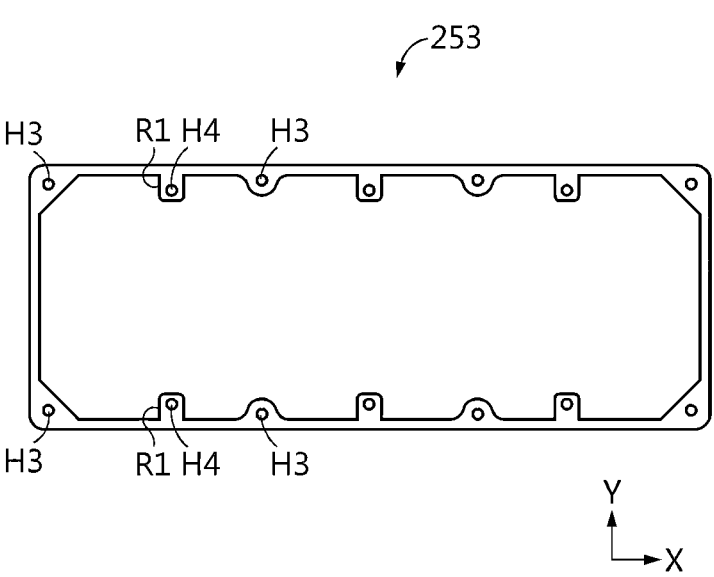
FIG. 12 is a top view schematically showing a middle case of a battery pack according to an embodiment of the present disclosure.

Referring to FIGS. 10 to 12, the battery pack 300 according to an embodiment of the present disclosure may include at least one battery module 200. Additionally, the battery pack 300 may further include a Battery Management System (BMS) 280 (in FIG. 1) to control the charge/discharge of the battery module 200.

Additionally, the battery pack 300 may include a pack housing 250. The pack housing 250 may include a top case 251, a bottom case 255 and a middle case 253. The middle case 253 may have the top coupled to the top case 251 and the bottom coupled to the bottom case 255. In this instance, the middle case 253 may be coupled to each of the top case 251 and the bottom case 255 using a bolt. A coupling groove H3 may be formed in the top and the bottom of the middle case 253. A coupling groove (not shown) may be formed in the bottom of the top case 251. A coupling groove (not shown) may be formed in the top of the bottom case 255.

Meanwhile, referring back to FIGS. 10 to 12, the middle case 253 may include a coupling rib R1 on the inner surface, and the coupling rib R1 may protrude inward and vertically extend. Here, 'inward' refers to a direction in which the internal components of the middle case 253 are disposed. The coupling rib R1 may be coupled to each of the first cover 221 and the second cover 223. In this instance, the coupling rib R1 and the first coupling portion 221b of the first cover 221 may be bolt-coupled to each other. The coupling rib R1 and the second coupling portion 223b of the second cover 223 may be bolt-coupled to each other. To this end, the coupling rib R1 may have a bolt hole H4 in each of top and bottom thereof, and the bolt may be inserted into the bolt hole H4.

According to this configuration of the present disclosure, the middle case 253 of the present disclosure includes the coupling rib R1 on the inner surface, the coupling rib R1 protruding inward and vertically extending, and the coupling rib R1 is coupled to each of the first cover 221 and the second cover 223 using the bolt, thereby limiting the vertical movement of the battery module 200 received in the pack housing 250 by the wide support area of the first cover 221 and the second cover 223 without a stopper. Additionally, the present disclosure may couple the battery module 200 received in the pack housing 250 to the middle case 253 rather than the top case 251 or the bottom case 255.

That is, the conventional art inserts the battery module 200 into the middle case 253, couples the top of the battery module 200 to the top case 251, and couples the bottom of the battery module 200 to the bottom case 255, causing inconvenience of having to handle a plurality of cases at the same time, while the present disclosure couples the battery module 200 to the middle case 253 and directly performs a coupling process with the middle case 253, thereby making an assembly process easy.

Additionally, the battery pack 300 according to an embodiment of the present disclosure may be included in a vehicle such as an electric vehicle or a hybrid electric vehicle. For example, the vehicle may include an electric scooter, an electric vehicle and a hybrid electric vehicle. That is, the vehicle according to an embodiment of the present disclosure may include the battery pack 300 including at least one battery module 200 according to an embodiment of the present disclosure as described above in the vehicle body.

The terms indicating directions as used herein such as upper, lower, left, exact, front and rear are used for convenience of description only, and it is obvious to those skilled in the art that the term may change depending on the position of the stated element or an observer.

While the present disclosure has been hereinabove described with regard to a limited number of embodiments and drawings, the present disclosure is not limited thereto and it is obvious to those skilled in the art that various modifications and changes may be made thereto within the technical aspects of the present disclosure and the equivalent scope of the appended claims.

EXAMPLE

The battery pack of example of the present disclosure includes the same components as the battery pack 300 shown in FIG. 1. In particular, as shown in FIG. 5, the battery pack of example includes two first fixing bars 231 and two second fixing bars 233 on each of the front surface and the rear surface of the first and second cell frames 211, 213. The first and second cell frames 211, 213 are coupled to each other using the screw bolts B3 inserted into the frame holes H2. Moreover, the first fixing bar 231 and the second fixing bar 233 are coupled to each other through the long bolts 240 that extend in the front-rear direction, to limit the front-rear movement of each of the first cell frame 211 and the second cell frame 213.

Additionally, as shown in FIG. 1, the battery pack 300 of example includes a first cover and a second cover on top and bottom respectively. The first cover 221 and the second cover 223 are coupled to each of the first fixing bar 231, the second fixing bar 233, the first cell frame 211, and the second cell frame 213 using screw bolts. Here, 21 screw bolts are coupled to the top of the battery pack, and 25 screw bolts are coupled to the bottom of the battery pack. In this instance, the coupling torque of the screw bolt is about 25 kgf.

Comparative Example

In the same way as the battery pack of example, the battery pack of comparative example of the present disclosure includes the first and second cell frames 211, 213 coupled with the screw bolts B3 inserted into the frame holes H2, but as opposed to the battery pack of example, does not include the first fixing bar, the second fixing bar, the first cover and the second cover. Additionally, the remaining elements of the battery pack are the same as the battery pack of example.

Test Example

To test the durability of each battery pack of example and comparative example, evaluation of the movement prevention characteristics of the battery pack is performed. The test method uses, for example, a small vibration evaluation process. The small vibration evaluation process is performed according to the test standards for small batteries of the vibration test T.3 corresponding to UN manual, chapter 3, subsection 38.3. In this instance, the vibration test conditions include the gravitational acceleration of 8 gn and the number of vibrations per unit time (frequency) up to 200 Hz. In these test conditions, the vibration test is performed for 3 hours in the axial direction of each of X-, Y- and Z-axis.

Figure 13:
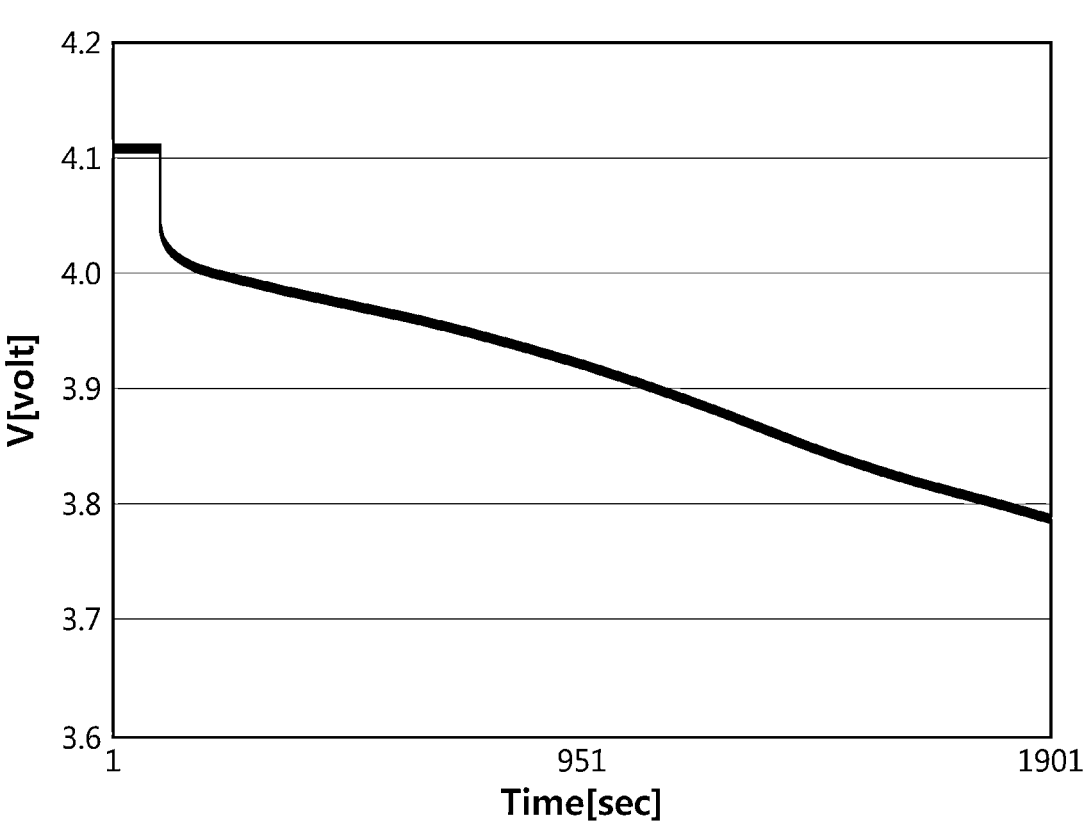
FIG. 13 is a discharge graph of example after a vibration test.
Figure 14:
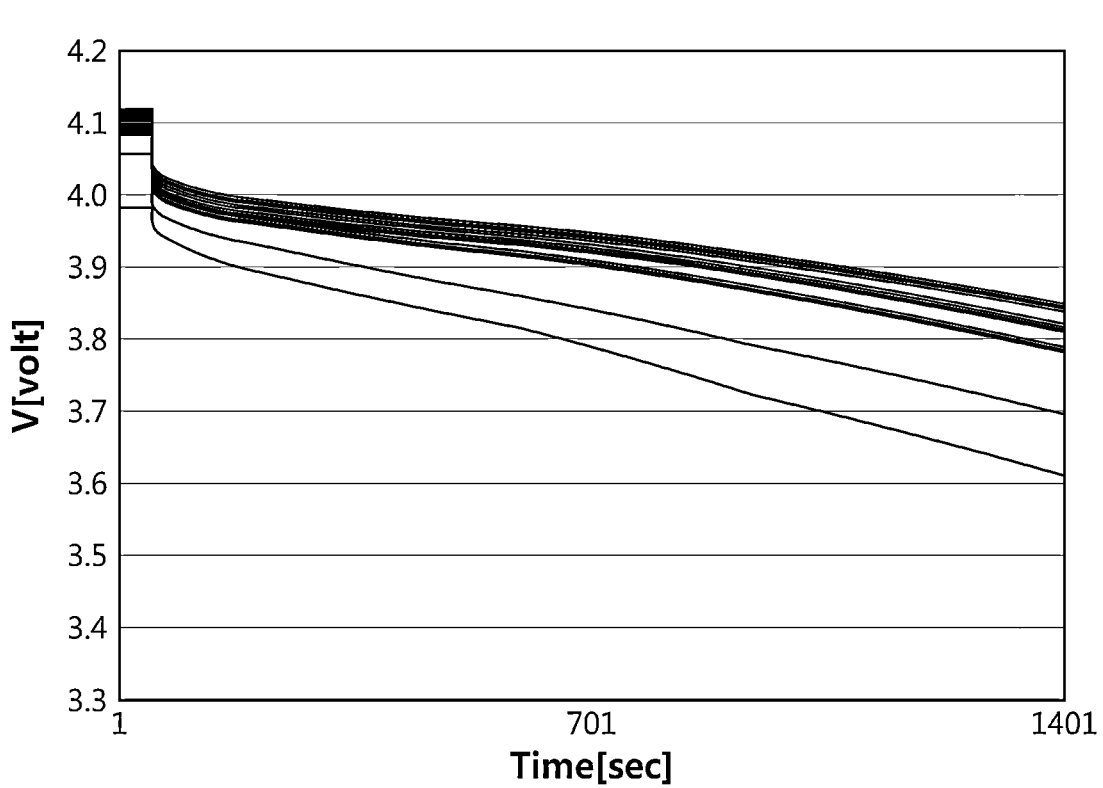
FIG. 14 is a discharge graph of comparative example after a vibration test.

Additionally, 154 battery cells received in each battery pack of example and comparative example are grouped into 14 groups (Bank), in which 11 battery cells forms a group. FIG. 13 shows a discharge graph of 14 groups (Bank) of example after the vibration test. Additionally, FIG. 14 shows a discharge graph of 14 groups (Bank) of comparative example after the vibration test. Additionally, for each of 14 groups (Bank) of example, the internal resistance (IR) of the battery cell of the battery pack before and after the test is measured and the measurements are shown in the table of FIG. 15.

As a result of the test, as shown in the graph of FIG. 13, 14 groups (bank) of example have almost no change in discharge voltage. Accordingly, in the example, it is determined that the battery module is not damaged enough to affect the discharge characteristics. Additionally, as shown in FIG. 15, in the comparison of internal resistance values of the battery pack of example before and after the test, an increase change in resistance value is not significantly great.

By contrast, as shown in the graph of FIG. 14, in the battery pack of comparative example, 14 battery cells of comparative example have differences in discharge voltage changes, so it is determined that an electrical disconnection between a faulty busbar and battery cells, or damage at the connected part between the busbar and the battery cell may cause a rise in electrical resistance.

While the present disclosure has been hereinabove described with regard to a limited number of embodiments and drawings, the present disclosure is not limited thereto and it is obvious to those skilled in the art that various modifications and changes may be made thereto within the technical aspects of the present disclosure and the equivalent scope of the appended claims.

| [Description of Reference Numerals] | |
|---|---|
| 300: Battery pack | |
| 200: Battery module | 290: Module busbar |
| 293, 295: First connection portion, second connection portion | |
| 211, 213: First cell frame, second cell frame | |
| P1: Hole | |
| 221: First cover | |
| 221a, 221b: First body portion, first coupling portion | |
| 223: Second cover | |
| 223a, 223b: Second body portion, second coupling portion | |
| 221c, 223c: First bent portion, second bent portion | |
| 230, 231, 233: Fixing bar, first fixing bar, second fixing bar | |
| 240: Long bolt | B1: Bolt head |
| B2, B3: Screw bolt | |
| H1, H2, H3, H4, H5, H6: Insertion hole, frame hole, coupling groove, bolt hole, coupling hole, connection groove | |
| 100: Battery cell | |
| 111, 112: Positive electrode terminal, negative electrode terminal | |
| 245: Reinforcement bolt | 260: Coupling member |
| 250: Pack housing | |
| 251, 253, 255: Top case, middle case, bottom case | |
| R1: Coupling rib | R2: Fixing rib |

What is claimed is:

1. A battery module, comprising:

a plurality of battery cells;

a first cell frame and a second cell frame, each extending in an X-Z plane, disposed at front and rear sides, respectively, and abuttingly coupled to each other to define internal spaces in which the plurality of battery cells are respectively disposed on a one-to-one basis, the first and second cell frames defining at least first and second holes therethrough in a Y-direction;

a pair of first fixing bars spaced apart with respect to an X-direction and each extending in a Z-direction, the pair of first fixing bars being disposed at a front surface of the first cell frame with respect to the Y-direction;

a pair of second fixing bars spaced apart with respect to the X-direction and each extending in the Z-direction, the pair of second fixing bars being disposed at a rear surface of the second cell frame with respect to the Y-direction;

a first bolt inserted into the first hole, the first bolt having a front end part coupled to a first one of the first fixing bars and a rear end part coupled to a first one of the second fixing bars;

a second bolt inserted into the second hole, the second bolt having a front end part coupled to a second one of the first fixing bars and a rear end part coupled to a second one of the second fixing bars, wherein the pair of first fixing bars, the pair of second fixing bars, the first bolt, and the second bolt being configured to limit movement of the first and second cell frames in the Y-direction;

a first cover configured to cover a top of the first cell frame and the second cell frame, a part of the first cover being coupled to top of each of the first fixing bars and the second fixing bars; and a second cover configured to cover a bottom of the first cell frame and the second cell frame, and coupled to the bottom of each of the first fixing bars and the second fixing bars, wherein the first cover includes a first bent portions extending down respectively along left and right outer surfaces of the first cell frame and the second cell frame, wherein the second cover includes a second bent portions extending up respectively along the left and right outer surfaces of the first cell frame and the second cell frame, wherein the first cover includes:

a first body portion horizontally extending to cover upper surfaces of the first cell frame and the second cell frame, the first bent portions extending down from left and right ends of the first body portion; and a first coupling portion stepped down from the first body portion, extending in the Y-direction from the first body portion and coupled to the top of each of the first fixing bars and the second fixing bars, and wherein the second cover includes:

a second body portion horizontally extending to cover lower surfaces of the first cell frame and the second cell frame, the second bent portions extending up from left and right ends of the second body portion; and a second coupling portion stepped up from the second body portion, extending in the Y-direction from the second body portion and coupled to the bottom of each of the first fixing bars and the second fixing bars, and wherein respective end parts of the first bent portions of the first cover and respective end parts of the second bent portions of the second cover are respectively coupled to each other.

2. The battery module according to claim 1, wherein the first cell frame includes a first hollow and the second cell frame includes a second hollow, and wherein the first and second hollows define a respective one of the internal spaces in which a respective one of the battery cells is disposed.

3. A battery pack, comprising:

at least one battery module according to claim 1; and a pack housing including a top case, a bottom case and a middle case having a top coupled to the top case and a bottom coupled to the bottom case.

4. The battery pack according to claim 3, wherein the middle case includes a coupling rib on an inner surface, the coupling rib protruding inward and vertically extending, and wherein the coupling rib is coupled to each of the first cover and the second cover.

5. A battery pack, comprising:

at least one battery module; and a pack housing including a top case, a bottom case and a middle case having a top coupled to the top case and a bottom coupled to the bottom case, wherein the at least one battery module comprises: a plurality of battery cells;

a first cell frame and a second cell frame, each extending in an X-Z plane, disposed at front and rear sides, respectively, and abuttingly coupled to each other to define internal spaces in which the plurality of battery cells are respectively disposed on a one-to-one basis, the first and second cell frames defining at least first and second holes therethrough in a Y-direction;

a pair of first fixing bars spaced apart with respect to an X-direction and each extending in a Z-direction, the pair of first fixing bars being disposed at a front surface of the first cell frame with respect to the Y-direction;

a pair of second fixing bars spaced apart with respect to the X-direction and each extending in the Z-direction, the pair of second fixing bars being disposed at a rear surface of the second cell frame with respect to the Y-direction;

a first bolt inserted into the first hole, the first bolt having a front end part coupled to a first one of the first fixing bars and a rear end part coupled to a first one of the second fixing bars;

a second bolt inserted into the second hole, the second bolt having a front end part coupled to a second one of the first fixing bars and a rear end part coupled to a second one of the second fixing bars, wherein the pair of first fixing bars, the pair of second fixing bars, the first bolt, and the second bolt being configured to limit movement of the first and second cell frames in the Y-direction;

a first cover configured to cover a top of the first cell frame and the second cell frame, a part of the first cover being coupled to top of each of the first fixing bars and the second fixing bars; and a second cover configured to cover a bottom of the first cell frame and the second cell frame, and coupled to the bottom of each of the first fixing bars and the second fixing bars, wherein the first cover includes a first bent portions extending down respectively along left and right outer surfaces of the first cell frame and the second cell frame, wherein the second cover includes a second bent portions extending up respectively along the left and right outer surfaces of the first cell frame and the second cell frame, wherein the middle case includes a coupling rib on an inner surface, the coupling rib protruding inward and vertically extending, and wherein the coupling rib is coupled to each of the first cover and the second cover.

6. A vehicle comprising at least one battery pack according to claim 5.

* * * * *